(12) United States Patent
Broyles et al.

(10) Patent No.: US 6,356,965 B1
(45) Date of Patent: Mar. 12, 2002

(54) HOTKEY FOR NETWORK SERVICE BOOT

(75) Inventors: Paul J. Broyles, Cypress; Don R. James, Jr., Houston, both of TX (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 09/149,336

(22) Filed: Sep. 8, 1998

(51) Int. Cl.[7] .......................... G06F 13/14; G06F 13/20
(52) U.S. Cl. .......................... 710/104; 713/2; 709/220; 709/226; 714/23
(58) Field of Search .................... 713/1, 2; 714/23; 710/104; 709/220–226

(56) References Cited

U.S. PATENT DOCUMENTS

| | | | | |
|---|---|---|---|---|
| 5,274,816 A | * | 12/1993 | Oka .............................. | 713/2 |
| 5,430,845 A | * | 7/1995 | Rimmer et al. ............. | 709/301 |
| 5,448,741 A | * | 9/1995 | Oka .............................. | 713/2 |
| 5,579,522 A | * | 11/1996 | Christeson et al. ........... | 713/2 |
| 5,596,711 A | * | 1/1997 | Burckhartt et al. .......... | 714/23 |
| 5,694,600 A | * | 12/1997 | Khenson et al. ............. | 713/2 |
| 5,696,968 A | * | 12/1997 | Merkin .......................... | 713/2 |
| 5,715,456 A | * | 2/1998 | Bennett et al. ............... | 713/2 |
| 5,822,582 A | * | 10/1998 | Doragh et al. ............... | 713/2 |
| 5,854,905 A | * | 12/1998 | Garney ....................... | 710/104 |
| 5,935,242 A | * | 8/1999 | Madany et al. ............... | 713/1 |
| 6,079,016 A | * | 6/2000 | Park ............................. | 713/2 |
| 6,101,601 A | * | 8/2000 | Matthews et al. ............ | 713/2 |

FOREIGN PATENT DOCUMENTS

JP 8-179937 A * 7/1996

OTHER PUBLICATIONS

Network Working Group, RFC 1350, *The TFTP Protocol* (Revision 2), Jul. 1992.
Network Working Group, RFC 1541, *Dynamic Host Configuration Protocol*, Oct. 1993.
Network PC System Design Guidelines, *A Reference for Designing Net PC Systems for Use with the Microsoft® Windows® and Windows NT® Operating Systems*, Version 1.0b, Aug. 5, 1997.
Wired for Management Baseline, Version 1.1a, *Specification to Help Reduce TCO for Business PCs*, Aug. 28, 1997.

* cited by examiner

*Primary Examiner*—Thomas Lee
*Assistant Examiner*—Rehana Perveen
(74) *Attorney, Agent, or Firm*—Conley, Rose & Tayon, P.C.; Michael F. Heim; Daniel J. Krueger (57) ABSTRACT

A computer system is provided with a dynamically reconfigurable boot order. In one embodiment, the computer comprises a user input device, a nonvolatile memory, a network interface, a boot trigger, and a CPU. The CPU is coupled to the user input device to detect a predetermined key press, coupled to the boot trigger to detect the assertion of a system reset signal, and coupled to the nonvolatile memory to retrieve a system BIOS in response to assertion of the system reset signal. The CPU executes the BIOS to initialize the computer system, and as part of the system initialization, the CPU determines a first target boot-up device. Preferably if the predetermined key has been pressed during the system initialization, the CPU alters the default boot order to select the network interface as the first target boot up device. The network interface is configurable to retrieve an operating system from a network device for the CPU to execute. The disclosed embodiment advantageously provides for reduced system installation and maintenance effort, and thereby lead to reduced costs for owners of computer networks.

13 Claims, 3 Drawing Sheets

HOTKEY FOR NETWORK SERVICE BOOT

BACKGROUND OF THE INVENTION

1. Field of the Invention

The present invention relates generally to a system and method for altering the order in which boot devices are tried during system initialization. More particularly, the present invention relates to a computer system having a boot order that is adjusted if a hotkey is pressed during the initialization of the system.

2. Background of the Invention

Due to the advent of power management technology and the more recent "instant-on" efforts, there are many ways in which a computer may exist in the "OFF" state. Examples include hard off (power is disconnected), soft off (power is supplied only to components which monitor activity external to the system), suspend mode (contents of memory are stored on disk and current state of computer is preserved while power consumption is reduced to a minimum level), and sleep mode (the clock signal is reduced or halted to some or all of the system components during periods of inactivity). The sleep and suspend modes may each be invoked at various levels, depending on the particular implementation of these modes, and recovery from these modes is implementation specific.

Turning a computer "ON" from the hard-off or the soft-off state causes the computer to begin an initialization process (often referred to as "boot-up"). In the initialization process, a system reset signal is asserted and released. After the de-assertion of the reset signal, many of the system peripheral components initialize themselves, retrieve configuration information from dedicated electrically erasable programmable read-only memories (EEPROMs), and enter an initialized state. At the same time, the central processing unit (CPU) resets itself and searches for instructions on how to prepare the system for operation. The initial instructions typically are included in the system's basic input/output system (system BIOS) which is executable code stored in a nonvolatile memory such as a read-only memory (ROM). The BIOS is built-in software that contains low-level code to control and provide access to the keyboard, display screen, disk drives, serial communications, and a number of miscellaneous functions. The BIOS also specifies a boot-up sequence for the CPU to execute to make the computer ready for operation. The CPU normally begins executing initialization routines from the BIOS ROM, but subsequently copies the BIOS code to main memory from which the BIOS code may thereafter be executed during normal computer operations.

Typically, the first thing that the BIOS instructs the CPU to do in the boot up process is to perform what is called the Power-On Self-Test, or POST for short. The POST is a built-in diagnostic program that checks much of the computer's hardware to ensure that everything is present and functioning properly before the BIOS begins the actual initialization process. Some additional tests are performed later in the boot process. If any fatal errors are encountered, the boot process stops. After the initial POST, the BIOS instructs the CPU to locate the video system's built in BIOS program and to execute it to initialize the video system. The CPU then displays the BIOS's startup screen, and searches for other devices to see if any of them have initialization routines. If any other device initialization routines (e.g. IDE hard drive) are found, they are executed as well.

After the video system has been initialized, the CPU will normally display a prompt similar to "Press F10 to enter SETUP" and continue booting up the system. If the user properly responds to the prompt, e.g. by pressing the F10 key within 3 seconds of the appearance of the prompt, the CPU will halt the system boot-up sequence and execute a BIOS setup program where the user is able to view and modify system configuration parameters. After the user exits the BIOS setup program, the computer restarts the boot-up sequence so that any modified configuration parameters may be properly taken into account during system initialization.

The CPU does more tests on the system, including the memory count-up test which may be viewed on the video display. If an error is encountered after the initialization of the video system, a text error message will generally be displayed on the video display. The BIOS boot-up sequence includes a "system inventory" of sorts, performing more tests to determine what sort of hardware is in the system. Modem BIOSes have many automatic settings and may, among other things, automatically determine memory timing based on what kind of memory it finds installed in the computer. Many BIOSes can also dynamically set hard drive parameters and access modes, and will determine these at roughly this time during the initialization process. The BIOS will also now instruct the CPU to search for and label logical devices (COM and LPT ports). If the BIOS supports the Plug and Play standard, the CPU will detect and configure Plug and Play devices at this time and display a message on the screen for each one it finds. The CPU will often display a summary screen about the system configuration and begin a search for a boot device.

Some modem BIOSes contain a boot table that specifies the order of devices from which the system should try to boot. If a first target device in the list is present and properly configured for booting, the BIOS will boot the system from this device. If the target device that the system tries is not found, the CPU will then try the next device in the boot table, and continue until it finds a bootable device. If no boot device at all can be found, the system will normally display an error message and then freeze up the system.

After having identified a target boot drive, the BIOS instructs the CPU to look for boot information to start the operating system boot process. For example, with a hard disk, the CPU may search for a master boot record at cylinder 0, head 0, sector 1 (the first sector on the disk). If the CPU finds the master boot record, the CPU starts the process of booting the operating system, using the information in the boot sector. At this point, the code indicated by the boot sector takes over from the BIOS code.

The boot devices which may be accessed during the above boot-up sequence include any nonvolatile storage device. Floppy disks, hard disks, magnetic tape, CD-ROMs, Flash ROMs, and network server disks are all examples of devices which can serve as a boot device. To be a boot device, a device should hold a copy of an operating system or application which is to be executed after system initialization. Often the boot device includes a "boot-sector" that informs the CPU of the operating system's exact storage location. Local devices (i.e. devices included in the computer or directly connected to the computer) may in some systems be preferred over remote devices (i.e. devices that need to be accessed via a network or shared communications link) for booting a computer system, while in other systems remote devices may be preferred.

Many variations exist for the boot-up sequence conducted by the BIOS. As computer hardware has become increasingly reliable, proposals have been made to eliminate POST tests altogether from the normal boot-up sequence. For example, in "Simple Boot Flag Specification: Version 1.0", Microsoft has proposed the use of a register to communicate boot options to the system BIOS. The boot flags are PNPOS, BOOTING, and DIAG. The PNPOS flag is asserted if the operating system normally used by the computer is Plug-and-Play capable. If this is the case, the BIOS does not need to spend time configuring components that the operating system will configure. The DIAG flag is de-asserted if hardware tests are considered unnecessary. In this case, the BIOS can skip the POST. The BOOTING flag, if asserted, indicates that the previous boot attempt did not successfully complete and the BIOS may choose to ignore the other flags and provide a complete system test and configuration sequence.

When a computer is in a soft-off, suspend, or sleep state, it may be configured to awaken if activity is detected, e.g. movement of a mouse or detection of a "wake up" data packet by a network interface card. The source of the triggering activity may come from a local mechanism (i.e. a switch or sensor of any kind such as a power switch, a reset switch, a pressable key, a pressure sensor, a mouse, a joystick, a touch pad, a microphone, or a motion sensor), or the trigger source may be remote.

Under certain circumstances, it would be desirable to be able to easily reconfigure the order in which devices are targeted for booting the computer. For example, a system administrator wishing to install a new operating system might prefer to bypass the local drives and boot directly from a network drive. In conventional systems, this would require the following steps by the administrator:

1. Reboot the computer.
2. Enter the BIOS setup program.
3. Find and change the boot order option.
4. Reboot the computer from the network.
5. Login to the network and install the new operating system.
6. Reboot the computer.
7. Enter the BIOS setup program.
8. Find and change to boot order option.
9. Reboot the computer normally.

This procedure is cumbersome and requires a significant amount of the administrator's time. Since this procedure must be repeated by the administrator for each computer in the network, a more streamlined approach is desirable.

SUMMARY OF THE INVENTION

Accordingly, there is provided herein a computer system having a dynamically reconfigurable boot order. In one embodiment, the computer comprises a user input device, a nonvolatile memory, a network interface, a boot trigger, and a CPU. The CPU is coupled to the user input device to detect a predetermined key press, coupled to the boot trigger to detect the to assertion of a system reset signal, and coupled to the nonvolatile memory to retrieve a system BIOS in response to assertion of the system reset signal. The CPU executes the BIOS to initialize the computer system, and as part of the system initialization, the CPU determines a first target boot-up device. Preferably if the predetermined key has been pressed during the system initialization, the CPU alters the default boot order to select the network interface as the first target boot up device. The network interface is configurable to retrieve an operating system from a network device for the CPU to execute. The disclosed embodiment advantageously provides for reduced system installation and maintenance effort, and thereby lead to reduced costs for owners of computer networks.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

In addition, certain terms are used throughout the following description and claims to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection or through an indirect electrical connection via other devices and connections.

DETAILED DESCRIPTION OF PREFERRED EMBODIMENTS

Figure 1:
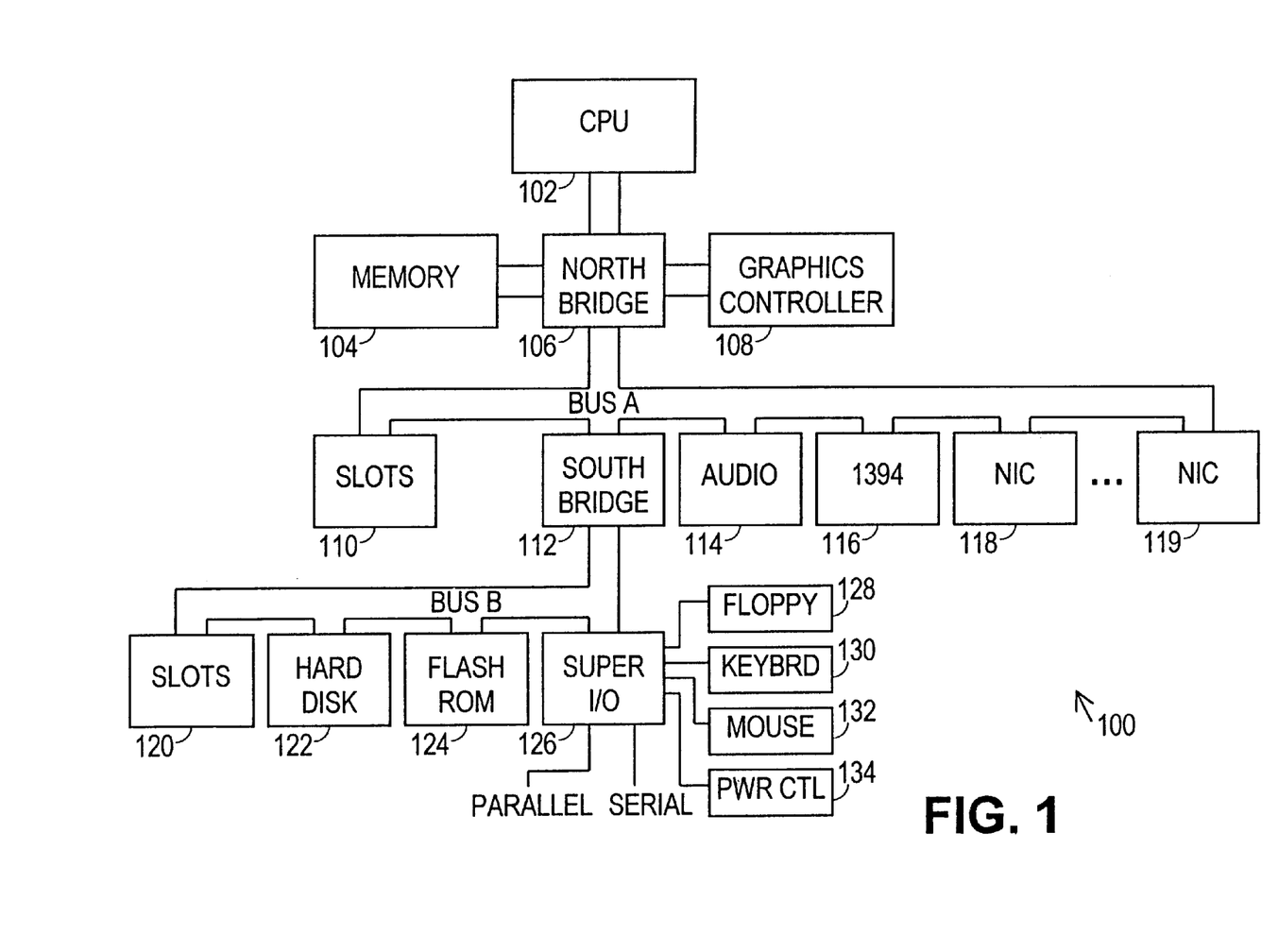
FIG. 1 is a block diagram of a computer system illustrating various system components.

Turning now to the figures, FIG. 1 illustrates an example of a configuration of various computer components that may be found in a computer system. It is noted that many other representative configurations exist and that this embodiment is described for illustrative purposes. The computer system 100 is preferably provided with a hotkey (shown in FIG. 2) for dynamically reconfiguring the boot order. If the hotkey is pressed during system initialization, the computer system 100 is configured to bypass local boot devices and boot from a remote boot device. Remote boot procedures using a Dynamic Host Configuration Protocol (DHCP—published as RFC 1541) and Trivial File Transfer Protocol (TFTP—published as RFC 1350) are described in "Network PC System Design Guidelines: Version 1.0b—Aug. 5, 1997" by Compaq, Dell, Hewlett Packard, Intel, and Microsoft, and "Wired for Management Baseline: Version 1.1a" published Aug. 28, 1997 by Intel. The foregoing references are hereby incorporated by reference.

The computer system 100 of FIG. 1 includes a CPU 102 coupled to a bridge logic device 106 via a CPU bus. The bridge logic device 106 is sometimes referred to as a "North bridge" for no other reason than it often is depicted at the upper end of a computer system drawing. The North bridge 106 also couples to a main memory array 104 by a memory bus, and may further couple to a graphics controller 108 via an accelerated graphics port (AGP) bus. The North bridge 106 couples CPU 102, memory 104, and graphics controller 108 to the other peripheral devices in the system through a primary expansion bus (BUS A) which may be implemented as a peripheral component interconnect (PCI) bus or an extended industry standard architecture (EISA) bus. Various components that comply with the communications protocol and electrical requirements of BUS A may reside on this bus, such as an audio device 114, a IEEE 1394 interface device 116, and a network interface card (NIC) 118. The system may include more than one network interface, as indicated by NIC 119. These components may be integrated onto the motherboard or they may be plugged into expansion slots 110 that are connected to BUS A.

If other secondary expansion buses are provided in the computer system, as is typically the case, another bridge logic device 112 is used to couple the primary expansion bus (BUS A) to the secondary expansion bus (BUS B). This bridge logic 112 is sometimes referred to as a "South bridge" reflecting its location vis-a-vis the North bridge 106 in a typical computer system drawing. An example of such bridge logic is described in U.S. Pat. No. 5,634,073, assigned to Compaq Computer Corporation. Various components that comply with the communications protocol and electrical requirements of BUS B may reside on this bus, such as hard disk controller 122, Flash ROM 124, and Super I/O controller 126. Slots 120 may also be provided for plug-in components that comply with the protocol of BUS B. Flash ROM 224 stores the system BIOS that is executed by CPU 202 during system initialization.

The Super-Input/Output (Super I/O) controller 126 typically interfaces to basic input/output devices such as a keyboard 130, a mouse 132, a floppy disk drive 128, a parallel port, a serial port, and sometimes a power controller 134 and various other input switches such as a power switch and a suspend switch. The Super I/O controller 126 preferably has the capability to handle power management functions such as reducing or terminating power to components such as the floppy drive 130, and blocking the clock signals that drive components such as the bridge devices 106, 112 thereby inducing a sleep mode in the expansion buses. The Super I/O controller 126 may further assert System Management Interrupt (SMI) signals to various devices such as the CPU 102 and North bridge 106 to indicate special conditions pertaining to input/output activities such as sleep mode.

Super I/O controller 126 may include battery-backed CMOS memory for storing BIOS configuration parameters for system 100, and may further include a counter or a Real Time Clock (RTC). The RTC may be used to track the activities of certain components such as the hard disk 122 and the primary expansion bus, so that controller 126 can induce a sleep mode or reduced power mode after a predetermined time of inactivity. The Super I/O controller 126 may also induce a low-power suspend mode if the suspend switch is pressed, in which the power is completely shut off to all but a few selected devices. Exempted devices might be the Super I/O controller 126 itself and NIC 118.

When a computer is in a soft-off, suspend, or sleep state, the Super I/O controller 126 may be configured to rouse the computer if activity is detected, e.g. a power switch closure, movement of the mouse 132 or detection of a "wake up" data packet by NIC 118. The source of the triggering activity may come from a local mechanism (i.e. a switch or sensor of any kind such as a power switch, a reset switch, a pressable key, a pressure sensor, a mouse, a joystick, a touch pad, a microphone, a motion sensor, or a biometric device (e.g. fingerprint reader)), or the trigger source may be remote and perhaps communicated to the computer system by a network, serial bus, modem, or some other communications link. When the computer system 100 is in a soft-off or hard-off state, and the Super I/O controller 126 detects a power switch closure, controller 126 asserts a system reset signal and initiates system boot-up. During system boot-up, the CPU 102 retrieves the BIOS from Flash ROM 124 and executes the BIOS. The BIOS stores various system configuration parameters in CMOS memory, and retrieves these parameters to initialize and configure various system components to place the system in readiness for operation by a user. One of the configuration parameters may be a preferred boot-order selected by the user in the BIOS setup program.

Referring still to FIG. 1, the BIOS stored in Flash ROM 124 includes a boot table which specifies a default boot order. The default boot order is the order in which the boot devices are normally accessed in an effort to locate and execute an operating system. The user can normally alter the default boot order by changing a parameter in CMOS memory contained in the Super I/O controller 126. One example of a popular boot order is:

CD-ROM
FLOPPY DRIVE
HARD DISK #1
SCSI
NETWORK DRIVE #1
NETWORK DRIVE #2

This order is popular because it allows the computer to operate from a local drive (e.g. the CD-ROM, floppy drive, or hard disk) whenever possible, thereby maximizing the performance of most systems. However, computers which for some reason may have missing or corrupted operating systems can still boot up using another copy of an operating system that may be stored elsewhere (e.g. the master copy of the operating system stored on a network server).

Figure 2:
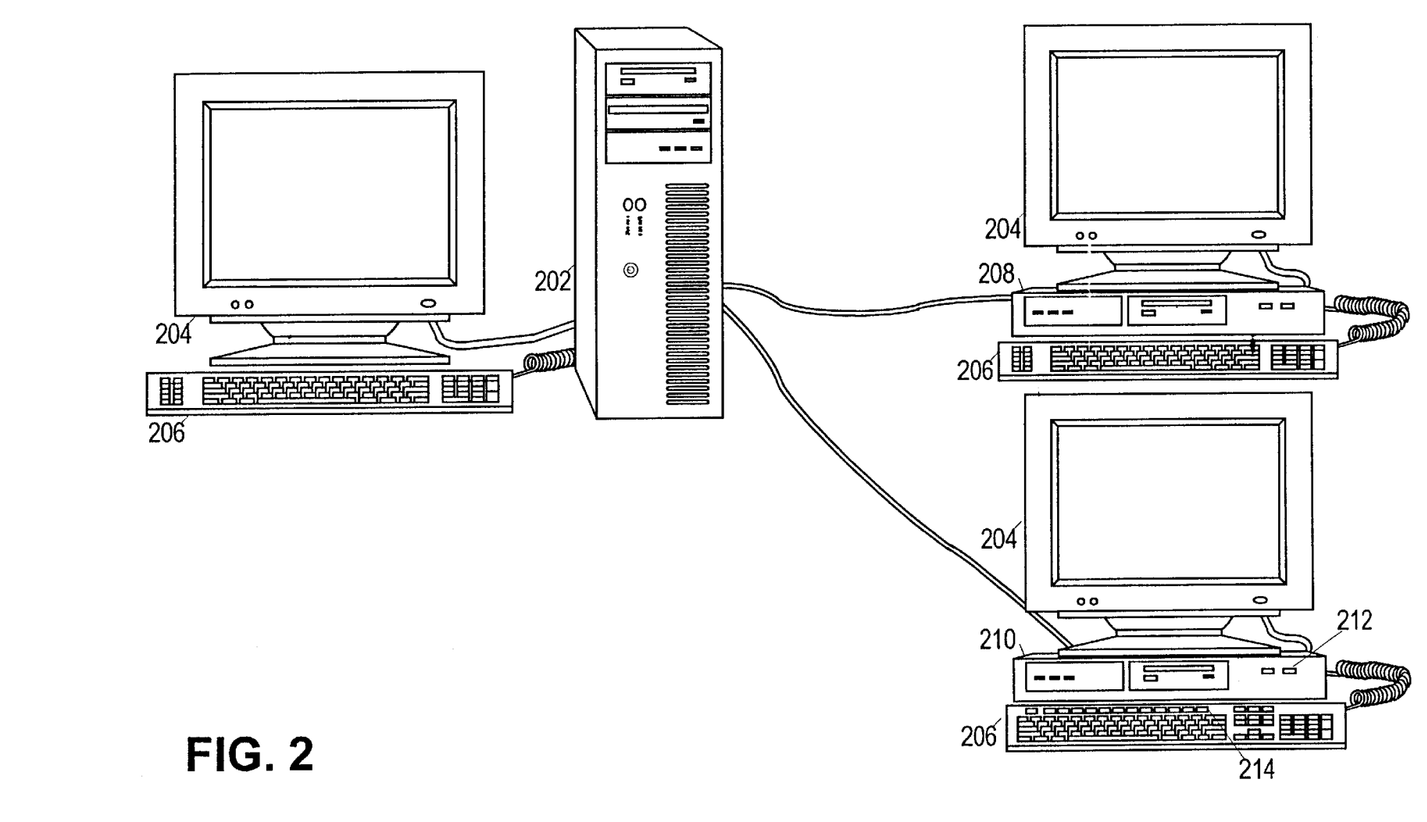
FIG. 2 is an illustrative diagram of a simple computer network.

FIG. 2 shows an example of a computer network in which a central server 202 is coupled to a first computer 208 and a second computer 210. Central server 202 and computers 208 and 210 may each be equipped with a terminal 204 and an input device 206, and may each be provided with an architecture similar to that of FIG. 1. Computer 210 is shown having a power button 212 and a function key 214. Most modem keyboards have ten or twelve function keys labeled F1-F10 or F1-F12 which are often located in a single row along the upper edge of the keyboard or in a group on the left-hand side of the keyboard. These function keys are often assigned to special purpose functions by software applications. For example, pressing F1 while a software application is running commonly opens up a "help window" whereby a user may find usage instructions for the software application.

Any key or key-combination (multiple keys which are pressed simultaneously) which invokes a special purpose function (i.e. a function other than causing an alphanumeric character to appear on the display) when pressed is commonly referred to as a "hotkey". One standard hotkey that is used for re-booting a computer is Control-Alt-Delete, in which the three keys Control, Alt, and Delete are pressed simultaneously. As the computer is booting up, a hotkey may be used by the user to enter the BIOS setup program. Typical examples of hotkeys used to invoke the setup program include Control-S, Shift-F1, Alt-F2, or F10. The BIOS software will normally display a prompt message indicating the key or key-combination which should be used by the user to gain access to the BIOS setup program.

It can be appreciated that the system administrator might desire to perform system maintenance of computers in the network without working through the cumbersome nine-step procedure outlined in the background section. It may be further appreciated that the system administrator might wish to boot each of the computers from a master copy of the operating system as part of the system maintenance. Examples of when this could be desirable include: installing a new operating system, virus scanning, and executing automated maintenance software. Providing a hot key for temporarily reconfiguring the boot order substantially reduces the effort required by the system administrator, as evidenced by the following example using F12 as the hot key, although any other unassigned key or key-combination may also be used:

1. Reboot the computer.
2. Press the F12 key to boot from the network.
3. Login to the network and install the new operating system.
4. Reboot the computer normally.

Some operating systems will allow the last two steps to be automated so that all the system administrator must do is reboot and press F12.

Figure 3:
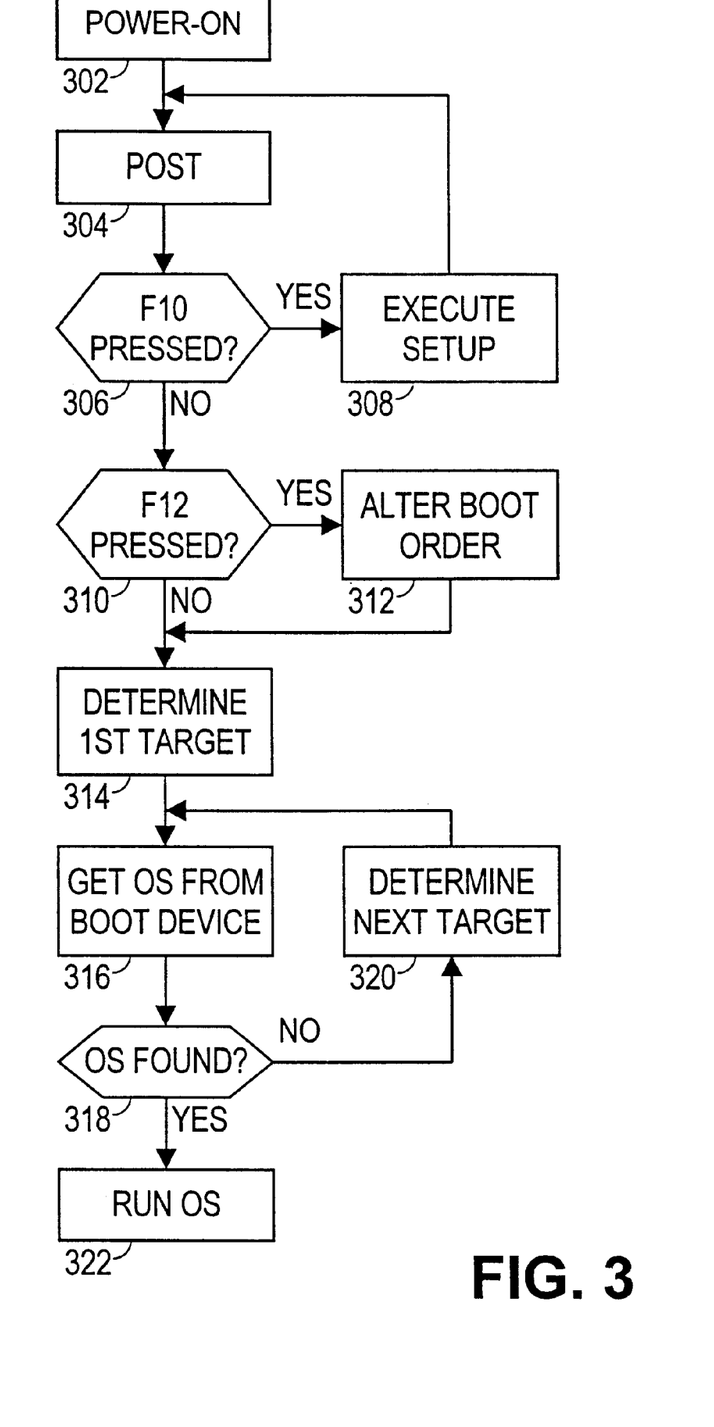
FIG. 3 illustrates a method for dynamically altering a computer's boot order.

FIG. 3 shows an illustrative flowchart which may be implemented by a computer's BIOS to provide dynamic configuration of the boot order. The flowchart includes a power-on step 302, a POST step 304, a first hot-key test step 306, a Setup execution step 308, a second hot-key test step 310, a boot order reconfiguration step 312, a determine first target step 314, an Operating System load step 316, a load success test 318, a determine next target step 320, and an execute Operating System step 322. In the flowchart of FIG. 3, the power-on step 302 can have multiple triggers, including a press of the power button 212 and detection of a wake-up packet by NIC 118. In the power-on step 302, power is provided to the computer's various system components including the CPU 102. The CPU 102 retrieves the BIOS from Flash ROM 124 and begins the POST portion of the boot-up sequence in step 304. During the POST step 304, the CPU 102 preferably displays a message on the display terminal similar to "F10=Setup, F12=Network boot". This message may be displayed after the CPU 102 has initialized the PCI devices and determined if indeed there is a network interface present.

In test step 306, the CPU 102 determines if the Setup hotkey has been pressed. If so, the CPU 102 executes the BIOS setup program in step 308. Otherwise, in step 310 the CPU 102 determines if the Network Boot hotkey has been pressed. To determine when keys are pressed, the CPU may employ polling or interrupt operations. A CPU which performs polling regularly checks the keyboard to determine if a key is being pressed, while a CPU which employs interrupts halts any current operations to respond to an interrupt signal generated by the keyboard when a key is pressed.

If so the CPU 102 determines that the Network Boot hotkey has been pressed, the CPU 102 alters the boot order in step 312. In a first embodiment, the CPU 102 temporarily re-orders the entries in the boot table so that the network boot devices are accessed first and the local drives are only accessed if the computer fails to boot from the network. However, the boot order parameter in CMOS memory and the original table stored in Flash ROM 124 preferably are not altered so that subsequent computer boot-ups will follow the original boot order. In a second embodiment, the CPU 102 bypasses the local drives and only attempts to boot from network devices in the boot table. In a third embodiment, the CPU 102 simply creates a new boot table entry for a network device as a temporary first entry before other entries in the existing boot table. This new entry may not necessarily be entered into the existing table; rather, the variable used to retrieve entry values from the table is simply initialized with the settings of a network boot device. Since this may lead to effectively having two entries for the network device, the CPU 102 may also implement a flag to indicate that the network drive has already been attempted to prevent a second attempt if the network drive appears again later in the boot table.

Using the original boot order, or the new boot order if a hotkey is detected, the CPU 102 determines a first target boot device in step 314 and attempts to retrieve an operating system from the target boot device in step 316. In step 318, the CPU 102 determines if the retrieval attempt was successful. If so, then in step 322, the BIOS turns control over to the retrieved operating system. If not, then in step 320, the CPU 102 determines a next target boot device, and loops back to step 316. The loop is repeated until an operating system is located or all boot devices have been unsuccessfully tried. If all boot devices have been unsuccessfully tried, the computer declares a fatal error and ceases all attempts to boot up.

An appendix is provided with assembler code excerpts from one BIOS implementation to illustrate one method for dynamically reconfiguring a computer system's boot order. After the POST has completed, the BIOS makes a call to the AttemptBypassBBS procedure. This procedure checks to determine if the F12 key has been pressed and, if so, calls the AttemptRIPL procedure. The AttemptRIPL procedure scans in order through the boot table for network interface cards (NICs) and boot-entry vector devices (BEV devices), and for each one found, calls the pbbsAttemptBoot procedure. The PCI Plug-N-Play standard defines BEV devices. A BEV device may be a network interface that includes an option ROM with executable code for locating a network server, retrieving a boot image of the operating system from the network server, and initiating execution of the boot image. The pbbsAttemptBoot procedure determines if the selected device is a bootable NIC or BEV device and attempts to boot from those devices determined to be bootable by calling a PXENVBoot procedure or a pbbsBootBEV procedure, respectively. If a successful boot occurs, no return from these procedures is expected.

Accordingly, a system and method which provide a dynamically reconfigurable boot order for a computer have been described. Numerous variations and modifications will become apparent to those skilled in the art once the above disclosure is fully appreciated. For example, the default boot order may be configured so that faster boot devices are tried before slower boot devices. In particular, to reduce boot-up time a local hard drive may be tried before a floppy disk or CD-ROM. A hotkey may be provided to reorder the boot-up sequence so that booting from the removable media devices (e.g. floppy disks, CD-ROMs) is tried before resorting to the local hard drive. It is intended that the following claims be interpreted to embrace all such variations and modifications.

APPENDIX

The following code excerpts are taken from a BIOS implementation of a hotkey for dynamically reconfiguring a computer's boot order to bypass local boot devices and boot from a network.

```
bbsTableEntry struc                                       ; BOOTSTRAP TABLE ENTRY
    DeviceType dw           EMPTY_TYPE                    ; DEVICE TYPE
       EMPTY_TYPE           EQU 0                         ; define types of devices
       FLOPPY_TYPE          EQU 1                         ;
       HDISK_TYPE           EQU 2                         ;
       CD_TYPE              EQU 3                         ;
       PCMCIA_TYPE          EQU 4                         ;
       USB_TYPE             EQU 5                         ;
       NIC_TYPE             EQU 6                         ;
       BEV_TYPE             EQU 80h                       ;
       UNKNOWN_TYPE         EQU 0FFh                      ;
StatusRec record R1:4=0,MediaPresent:2,BootFail:1,EnableBoot:1,R2:4=0,LastBoot:4
    StatusFlags StatusRec <>                              ; STATUS FLAGS
       NO_BOOT_MEDIA        EQU 0                         ; StatusRec.MediaPresent equates
       UNKNOWN_MEDIA        EQU 1                         ;
       BOOT_MEDIA           EQU 2                         ;
    union                                                 ; BOOT HANDLER LOCATION
       struc                                              ;
         BootHandler   dd      7C000000h                  ; Segment:Offset of Boot handler:PT925
       ends                                               ;
       struc                                              ;
         BootHandlerOff dw  ?                             ;
         BootHandlerSeg dw  ?                             ;
       ends                                               ;
    ends                                                  ;
    union                                                 ; DEVICE DESCRIPTION LOCATION
       struc                                              ;
         String DescString dd 0F0000000h;                 Segment:Offset of Descript. String:PT925
       ends                                               ;
       struc                                              ;
         DescStringOff dw     ?                           ;
         DescStringSeg dw     ?                           ;
       ends                                               ;
    ends                                                  ;
    Expansion       dd     0                              ; RESERVED
bbsTableEntry ends                                        ;
;****************************************************************
;
;       rbbsIPLTable - IPL Table Data Structure
;
;****************************************************************
rbbsIPLTable bbsTableEntry MAX_DEVICES DUP ({ }) ; IPL table
;****************************************************************
;
;    AttemptBootDiag - Check for signature if found then boot    ;PT925
;
;****************************************************************
AttemptBypassBBS  proc   near
    call rkbdF12Pressed?                    ; Q: User pressed F12?
    jz   short    @f                        ;    N: skip to next text
    call AttemptRIPL                        ;    Y: boot to network
@@:
 .
 .
 .
AttemptBypassBBS endp
;****************************************************************
;
;    AttemptRIPL
;
;    This function attempts to boot from the highest priority NIC_TYPE or
;    BEV_TYPE device
;
;    Procedure:
;        Scan through IPL priority until a NIC_TYPE or BEV_TYPE is found
;        call pbbsAttempBoot with index
;
;****************************************************************
public AttemptRIPL
AttemptRIPL proc near
         push      ax
         push      cx
         push      si
         push      es
```

-continued

APPENDIX

The following code excerpts are taken from a BIOS implementation of a hotkey for dynamically reconfiguring a computer's boot order to bypass local boot devices and boot from a network.

```
            mov     ax,SEG rbbsIPLDevs      ;
            mov     es,ax                   ;
            mov     ch,cs:[rbbsIPLDevs]     ; Initialize loop max
            xor     cl,cl                   ; start with first device
RIPLLoop:                                   ;
            lea     si,rbbsIPLTable         ; SI points to first entry in IPL tbl
            call    pbbsGetTblIndex         ; Get index into table
            movzx   ax,bl                   ; AX = index into IPL table
            mov     di,SIZE bbsTableEntry   ; DI=size of IPL entry
            mul     di                      ; AX=DI * index
            add     si,ax                   ; SI -> bbsTableEntry[bl]
            cmp     es:[si].DeviceType,NIC_TYPE ;Q: Onboard NIC device!
            je      short GotIt             ;     Y: We're done
            cmp     es:[si].DeviceType,BEV_TYPE ; Q: BEV Device?
            je      short GotIt             ;     Y: We're done
            inc     cl                      ; go to next device
            cmp     cl,ch                   ; Q: Last device?
            jb      short RIPLLoop          ;     N: keep looking
            jmp     RIPL_Done               ;     Y: get out
GotIt:
            call    pbbsAttemptBoot         ; BL has index of device to boot
RIPL_Done:
            pop     es
            pop     si
            pop     cx
            pop     ax
            ret
AttemptRIPL endp
;*********************************************************************
;
;   pbbsAttemptBoot - Attempt to boot from specified IPL device
;
;   Entry: BL - index into IPL table
;   Return (if it returns): CL, CH, BH restored
;
;*********************************************************************
pbbsAttemptBoot proc near                   ;
.
.
.
@@:                                         ;
            cmp     ax,NIC_TYPE             ;
            jne     SHORT @F                ;
            mov     ax,NIC_TYPE             ;
            call    pbbsBootMsg             ;
            call    pbbsBootUpNIC?          ; Q: Up or down NIC
            call    PXENVBoot               ; Boot NIC
            jmp     SHORT no_boot           ; Recover
@@:
            cmp     ax,BEV_TYPE             ;
            jne     SHORT no_boot           ; Hmmmmmm
            test    cs:[si].StatusFlags,0200h ; Q: First attempt?
            jz      BEV_OK                  ;     Y: go boot
            call    rbbsBEVFailedMsg        ;     N: no boot after failed
            jmp     no_boot
BEV_OK:
            call    pbbsBootMsg             ;
            test    cs:[si].StatusFlags,0100h ; Q: Ignore this BEV?
            jz      no_boot                 ;     Y: Exit
            call    pbbsBootBEV             ; Boot BEV
.
.
.pbbsAttemptBoot endp
```

What is claimed is:

1. A computer system having a dynamically reconfigurable boot order, wherein the computer system comprises:
   a user input device;
   a nonvolatile memory that stores a BIOS which specifies a first boot order;
   a boot trigger configurable to momentarily assert a system reset signal;
   a CPU coupled to the boot trigger to detect the assertion of the system reset signal, coupled to the nonvolatile memory to retrieve the BIOS in response to assertion of the system reset signal, and coupled to the user input device to detect one or more key presses,
   wherein the CPU determines a second boot order if the predetermined key press is detected, wherein the second boot order is a re-ordering of the first boot order.

2. The computer system of claim 1, wherein the user input device is a keyboard.

3. The computer system of claim 1, wherein the predetermined key press is part of a predetermined key-combination.

4. The computer system of claim 1, wherein the predetermined key press is operation of a function key.

5. The computer system of claim 1, wherein the predetermined key press is operation of a function key labeled F12.

6. The computer system of claim 1, wherein the boot trigger is a power switch.

7. A computer system having a dynamically reconfigurable boot order, wherein the computer system comprises:
   a user input device;
   a nonvolatile memory that stores a BIOS;
   a network interface configurable to retrieve an initial program via a network
   a boot trigger configurable to momentarily assert a system reset signal;
   a CPU coupled to the user input device to detect a predetermined key press, coupled to the boot trigger to detect the assertion of the system reset signal, coupled to the nonvolatile memory to retrieve the BIOS in response to assertion of the system reset signal, and coupled to the network interface to receive the initial program,
   wherein the CPU is configured to execute the BIOS to determine a first target boot-up device, wherein the CPU determines that the first target boot-up device is the network interface if the predetermined key press is detected, and wherein the CPU determines that the first target boot-up device is a local device otherwise,
   wherein the BIOS specifies a first boot order, and wherein the CPU determines a second boot order if the predetermined key press is detected, wherein the second boot order is a re-ordering of the first boot order such that the second boot order begins with a network interface present in the first boot order.

8. A method for booting up a computer, wherein the method comprises: detecting a trigger event;
   applying power to a CPU;
   retrieving a BIOS that specifies a first boot order;
   determining if a predetermined key has been pressed; and
   creating a second boot order different from the first boot order if the predetermined key has been pressed after the trigger event, wherein the second boot order is a re-ordering of the first boot order.

9. The method of claim 8, wherein the second boot order begins with a network interface.

10. The method of claim 8, wherein the predetermined key is a function key.

11. The method of claim 8, wherein the predetermined key press is part of a predetermined key-combination.

12. A method for booting up a computer, wherein the method comprises:
    detecting a trigger event;
    applying power to a CPU;
    retrieving a BIOS that specifies a first boot order;
    determining if a predetermined key has been pressed;
    if the predetermined key has not been pressed:
       selecting a first target boot device from the first boot order; otherwise,
    if the predetermined key has been pressed:
       creating a second boot order which is a reordering of the first boot order;
       selecting a first target boot device from the second boot order; and
    accessing the first target boot device to retrieve an operating system.

13. The method of claim 12, further comprising:
    determining if the operating system has been found;
    selecting a next target boot device if the operating system has not been found; and
    executing the operating system if the operating system has been found.

* * * * *